March 8, 1966 K. E. HANSSMANN 3,239,013
TORSION BAR SPRING DRAFT SENSING MEANS FOR
IMPLEMENT HITCH MECHANISM
Original Filed Dec. 19, 1960 4 Sheets-Sheet 1

INVENTOR
KURT E. HANSSMANN

ATTORNEY

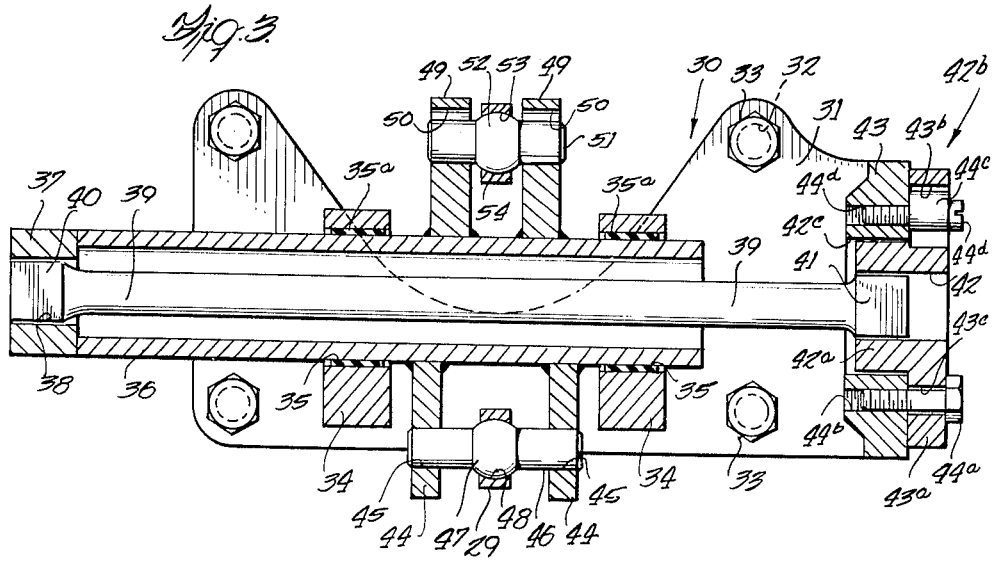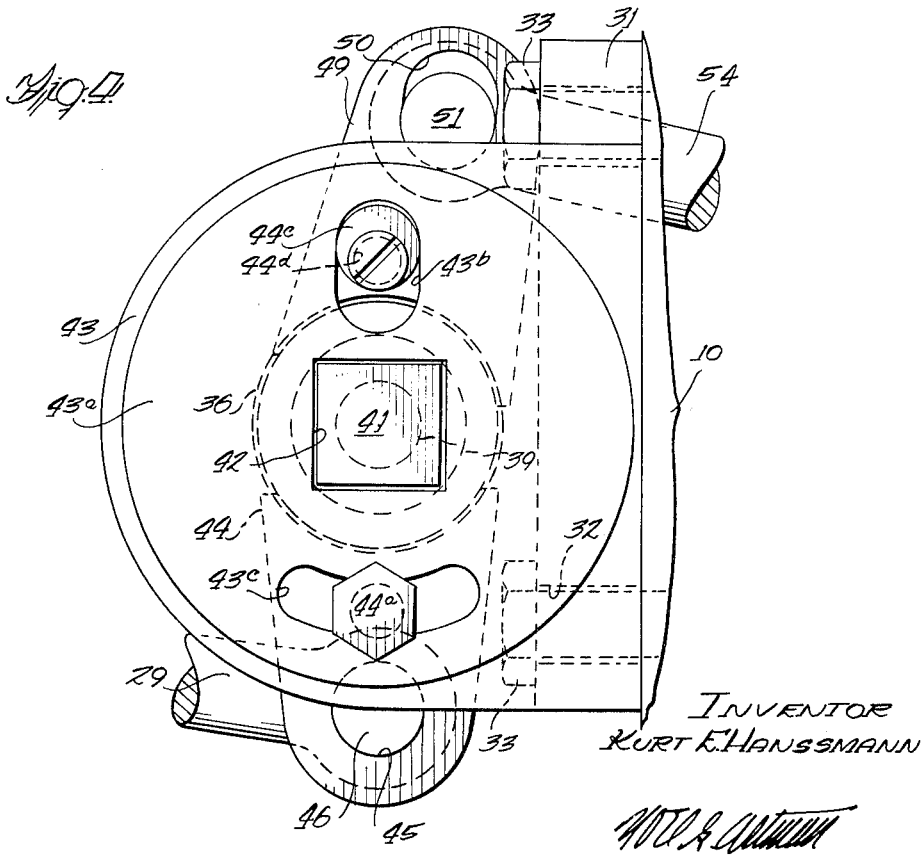

March 8, 1966  K. E. HANSSMANN  3,239,013
TORSION BAR SPRING DRAFT SENSING MEANS FOR
IMPLEMENT HITCH MECHANISM
Original Filed Dec. 19, 1960  4 Sheets-Sheet 3
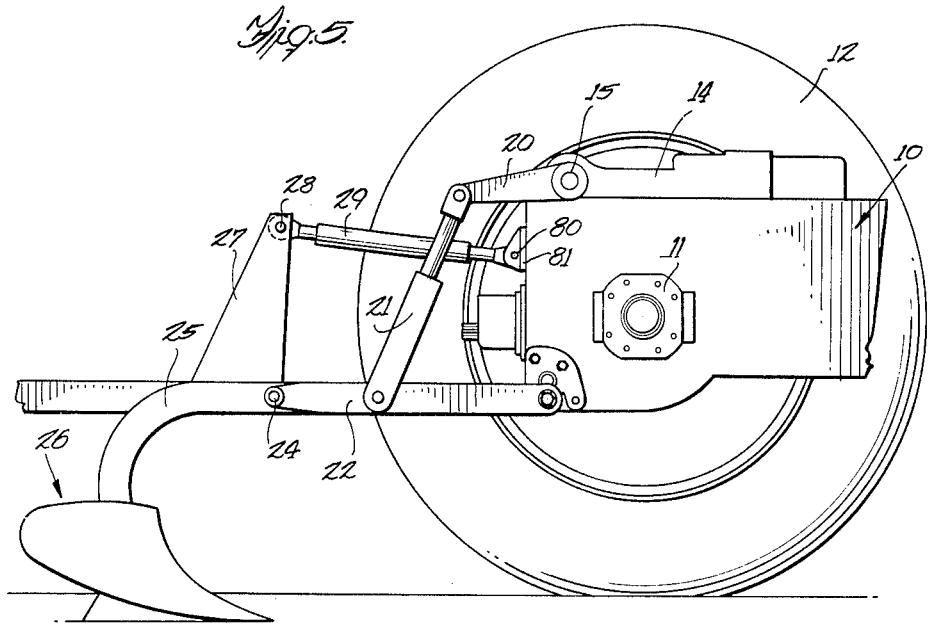
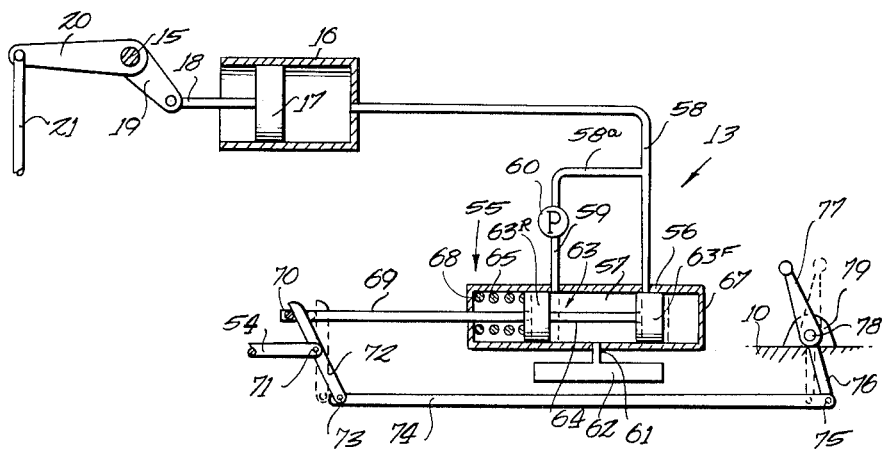
INVENTOR
KURT E. HANSSMANN
ATTORNEY March 8, 1966  K. E. HANSSMANN  3,239,013
TORSION BAR SPRING DRAFT SENSING MEANS FOR
IMPLEMENT HITCH MECHANISM
Original Filed Dec. 19, 1960  4 Sheets-Sheet 4

INVENTOR
KURT E. HANSSMANN

ATTORNEY

United States Patent Office 3,239,013
Patented Mar. 8, 1966

3,239,013
TORSION BAR SPRING DRAFT SENSING MEANS
FOR IMPLEMENT HITCH MECHANISM
Kurt E. Hanssmann, Naperville, Ill., assignor to International Harvester Company, Chicago, Ill., a corporation of New Jersey
Original application Dec. 19, 1960, Ser. No. 76,903. Divided and this application May 23, 1963, Ser. No. 287,732
12 Claims. (Cl. 172—10)

This application is a division of the application Serial No. 76,903, filed December 19, 1960, for Torsion Bar Spring Draft Sensing Means for Implement Hitch Mechanism.

This invention relates to implement-attaching hitch mechanisms for agricultural tractors and is particularly concerned with the draft control system usually employed therewith. More specifically, however, it is directed to improvements in the type of control system in which the draft load is balanced against a force-resisting and yieldable means, generally in the form of a spring, and a power lift mechanism is actuable responsive to variations in the draft load for adjusting the working depth of an attached implement in consonance with such variations.

Heretofore, means have been provided for the balancing of draft load or draft forces in such systems and most frequently this was accomplished by the use of some form of spring, or springs, operative to resist the compression and tension forces produced in the draft links of the hitch linkage mechanism used for connecting the implement to the tractor. In the structure disclosed in the Martin Patent 2,440,550 a pair of side-by-side coiled springs were connected to the upper link, and in the Chambers Patent 2,437,875 a single coiled spring associated with the upper link was interconnected for two-way reaction therewith, while in the Du Shane Patent 2,940,530 a transversely disposed deflecting bar was used as the resiliently yieldable means for balancing the draft forces in the hitch linkage. These prior devices while generally acceptable for the purpose were not entirely satisfactory because they either were not sufficiently sensitive, foolproof, or adequately responsive to changes in draft loads, or, in some instances, were too costly to fabricate, while in other instances, they could not be adapted for incorporation in a conventional tractor without effecting substantial and costly structural changes therein.

The present invention, therefore, has for its principal object the provision of an implement draft control system that overcomes the aforementioned disadvantages and handicaps of prior systems.

Another object is to provide an improved and simplified resiliently yieldable means that occupies a minimum amount of space for balancing draft forces and for transmitting sensing signals indicative of the resultant forces to power lift actuating means for adjusting the working depth of an attached implement attendant the variations in draft loads on said implement.

A further object is to provide force resisting and yieldable means in the form of members stressable in torsion that are interconnected between the draft means and the tractor for resisting compression and tension forces produced in said draft means as a result of variations in draft loads on an attached implement, and wherein the angular movement of certain of these members is employed to initiate a sensing signal for effecting actuation of the power lift valve or actuator means according to the draft loads on the implement.

A still further object is to provide means interconnecting a draft link of a hitch mechanism to a tractor, and wherein said interconnecting means is disposed transverse to the direction of movement of said draft link and is reactive in torsional stressing to resist compression and tension forces produced in said draft link as a result of variations in draft loads imposed on an implement attached by said hitch mechanism to the tractor.

A more general object is to provide a highly sensitive, readily responsive and inexpensive to fabricate force-resisting and yieldable means employing therewith a member stressable in torsion which is positively interconnected between a draft link of a hitch mechanism and an associated tractor vehicle, and wherein longitudinal movements of said draft link attendant variations of draft loads imposed on an attached implement are transmitted with fidelity and without lost motion or time lag to the actuating valve means of an associated power lift mechanism.

The foregoing and other objects and advantages are attained by the present invention, various novel features of which will be apparent from the description herein and the accompanying drawings disclosing several embodiments of the invention and will be more particularly pointed out in the appended claims.

FIGURE 3 is a fragmentary vertical sectional view, in enlarged detail, taken generally along the line 3—3 of FIGURE 1;

FIGURE 4 is a fragmentary side-elevational view, in enlarged detail, showing the upper link mounting mechanism, of FIGURE 3;

FIGURE 5 is a view similar to FIGURE 1 but showing an application of the invention as applied in association with the lower draft links of the hitch mechanism;

FIGURE 8 is a schematic view similar to FIGURE 2 but showing the valve device and its associated components, conditioned for raising the attached implement.

Figure 1:
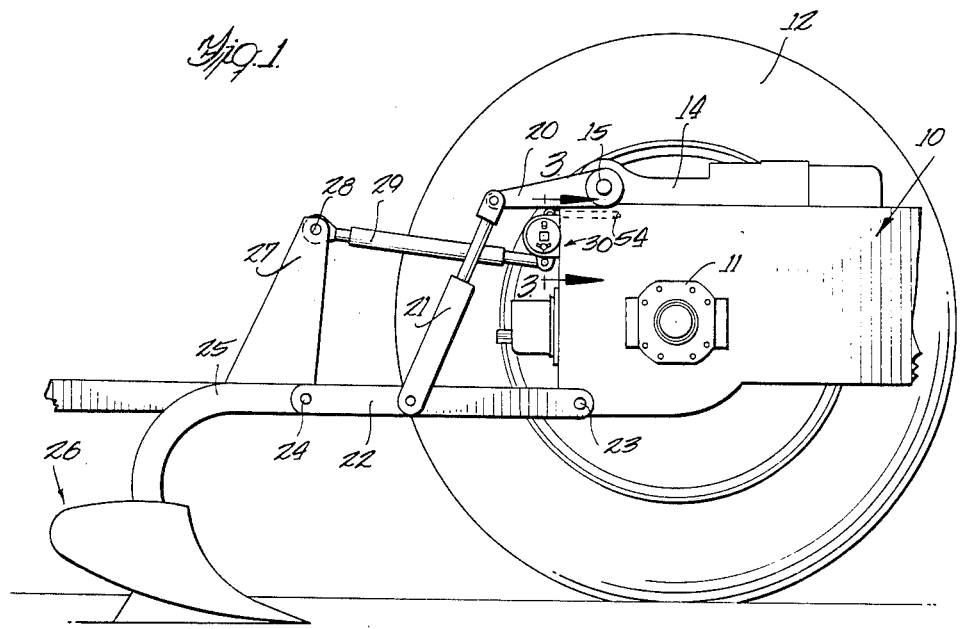
FIGURE 1 is a fragmentary side-elevational view of the rear portion of a tractor and an attached implement wherein the proposed invention has been incorporated in association with the upper link of a hitch mechanism.

Referring now to the drawings, it will be seen that the arrangement selected for depicting one preferred form or application of the invention includes a tractor vehicle having a frame indicated in its entirety by the reference numeral 10 and having at the rear portion thereof a rear housing assembly 11 which supports in conventional fashion laterally spaced traction wheels such as the wheel shown at 12.

Figure 2:
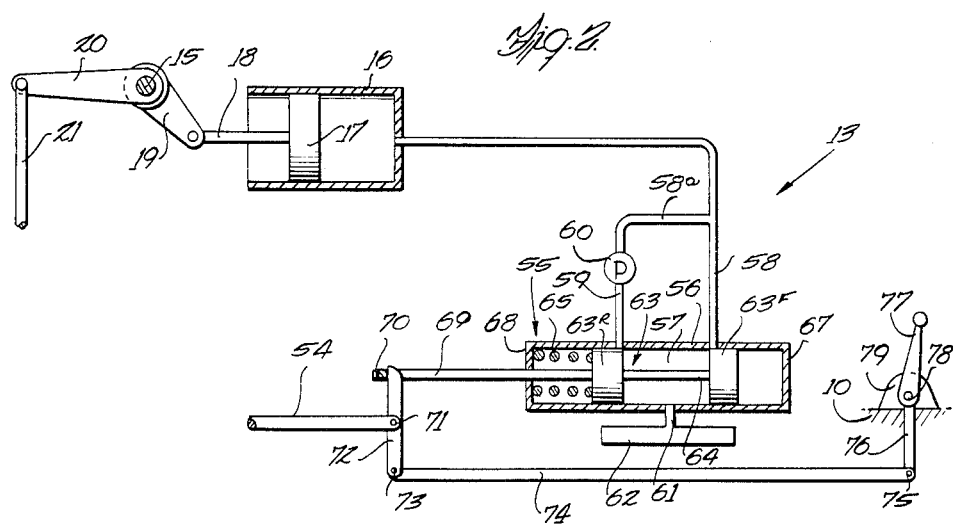
FIGURE 2 is a schematic view, partly in section, showing the power lift means, its valve actuator, and the proposed sensing and control means therefor.

The tractor has associated therewith the power-lift unit means shown diagrammatically in FIGURES 2 and 8 and indicated generally by the reference character 13, and this unit may be mounted in a secondary housing such as 14, carried by the tractor frame 10 and may include a rockshaft 15 journaled therein. A cylinder 16 fashioned within said housing has a piston 17 therein joined by a connecting rod 18 to a crank arm 19 constrained for rotation with said rockshaft, and a pair of laterally spaced lift arms, only one of which is shown at 20, are mounted on opposite ends of said rock shaft and are suitably secured thereto for rotation therewith. Each of said lift arms 20 is connected by a drop link 21 (only one of which is shown) to a lower draft link 22 which latter link, in turn, is pivotally connected for vertical and swingable movement at its forward end, as indicated at 23, to the rear portion of the tractor and at its rearward end, as indicated at 24, to the frame 25 of the attached implement represented herein as a plow 26. The rigid mast portion 27 of said implement has the upper end thereof pivotally connected at 28 to an upper or top draft link 29 which, in turn, is connected at its forward end to the tractor. The lower links 22, 22 and the upper link 29 comprise what are commonly termed implement-attaching linkage mechanism or draft means for effecting a draft connection between the tractor and the implement being borne by the vehicle.

The hitch mounting means constituting the support for the forward end of the upper link 29 on the tractor incorporates therein the force-resisting and yieldable means which represents one preferred form of the present invention and will next be described.

A load-spreading and reaction force orienting support or mounting assembly indicated generally at 30 includes a vertically disposed body portion 31 provided with apertures 32 through which bolts 33 may be positioned for securely affixing said assembly to a rear vertical face of the rear axle housing assembly portion of the tractor frame 10. Projecting rearwardly from the body 31 and laterally spaced-apart thereon are a pair of journalling lugs or blocks 34, 34. Said journalling blocks have transversely disposed aligned apertures 35, 35 therein, and journaled within said apertures in bearing sleeves 35a is a transversely extending sleeve or hollow tubular member 36. One end of said sleeve or tube has suitably affixed thereto, by any well known or conventional means, a collar or end plate member such as 37 having an opening 38 therein for receivably positioning one end of an elongated torsion rod member 39. The opening 38, as shown, is generally square in cross-section and is dimensioned and shaped to receive in closely fitting relation a similarly conformed enlarged or upset end portion 40 on the torsion rod 39. It will be appreciated, of course, that splines on said rod end 40 with matching splines in the aperture 38 could be provided, or that other geometric conformations for the rod end and its complemental opening, could just as well be used, in lieu of the squared rod and hole connection illustrated for mounting said rod within the collar 37 so as to prevent relative rotation therebetween, without deviating from any of the teachings of this invention. The opposite end of said torsion rod is also provided with an enlarged or upset end portion such as 41 which may be similarly conformed and then slidably received in a complemental opening 42 fashioned in the hub 42a of an insert or bushing-like member 42b which, in turn, is positioned in a circular opening 42c in a wall-like arm or anchor bracket 43 extending rearwardly from the body portion 31 of said mounting assembly. The bushing 42b may include a radially extending flange 43a which has provided therein an axially and radially extending slotted opening 43b and a circumferentially and radially extending slotted opening 43c. A locking capscrew 44a extends through the circumferentially slotted opening 43c and is threadably received in a threaded aperture 44b in the anchor bracket 43. An eccentric cam screw 44c is positioned in the radially slotted opening 43b and is threadably received in a threaded aperture 44d in said anchor bracket. With this mounting means for the torsion bar, it will be appreciated that rotational adjustment thereof may readily be made in order to effect a small rotational displacement of the rod without disturbing the associated components of the mechanism as will subsequently be better understood.

Affixed to the sleeve or tubular member 36 are a pair of laterally spaced-apart link connecting arms 44, 44 which are constrained for rotation with said sleeve, and said arms are provided with axially aligned openings 45, 45 therein adapted to receive a pin, such as 46, having a spherical portion 47 thereon for accommodating a mating spherical aperture 48 in the forward end of the top or upper link member 29. Diametrically opposite the arms 44, 44 and mounted on the sleeve 36 for rotation therewith are another pair of laterally spaced-apart control rod connecting arms 49, 49 having aligned slot-like or irregular-shaped apertures 50, 50 therein adapted to receive a pin 51 with a spherical portion 52 thereon for positioning in a mating spherical aperture 53 in the rearward end of a sensing control or push rod 54. As shown, the arms 44, 44 and 49, 49 are connected by welding to the sleeve 36 but it will be appreciated that any well known means, such as splining or otherwise, may be used, if preferred, for affixing the arms to the sleeve without deviating from any of the essential teachings hereof. It will also be appreciated that the arms 44, 44 and 49, 49 together with a portion of the interconnecting sleeve 36 may be spoken of as a bell-crank or reaction lever means.

As thus arranged, it will be evident that when a force is applied by way of the link 29 to the link connecting arms 44, 44 such force, in turn, is transmitted by way of the interconnected push-rod arms 49, 49 to the sensing push-rod 54 for transmitting a sensing signal to the actuator valve unit as will subsequently be described. It will be apparent, of course, that any force applied to the arms 44, 44, by way of link 29, tends to rotate the sleeve 36 within its journal blocks 34, 34 and when this occurs the sleeve carries with it the attached torsion rod 39. Since the opposite end of said torsion rod is anchored against rotation by means of the insert bushing 42b and anchor bracket 43, said bar will thereupon tend to twist along its length and, in doing so, provide a reaction that resists the force applied thereto through the link 29. This reaction will, of course, tend to balance the force created as a result of the change in draft loads on the implement, and when this reaction is sufficient to counteract the force resulting from the change in draft load there will be no longitudinal movement of the push rod 54. However, if the increased draft force produces a resultant force in said link that is greater than the reactive force of the torsion rod 39 there will be a longitudinal movement of the push-rod 54 and an actuating or sensing signal will be transmitted to the actuator valve of the lift mechanism 13.

The sensing signal, generated as a result of movement of the push rod 54 by the draft link 29, is used to control the power lift means 13 by coordinated actuation of the actuator means 55. The longitudinal position or displacement of the push-rod 54 relative to the connecting arms 49, 49 and the actuator means may be altered or adjusted on occasion to accommodate for wear, increased sensitivity, inaccuracies of manufacture or the like, as desired, with a minimum of difficulty. To accomplish such adjustment the locking screw 44a is first loosened, then the eccentric cam screw 44c is turned clockwise or counterclockwise as appropriate to effect a rotative displacement of the insert bushing 42b which carries with it the interconnected bar 39, sleeve 36, arms 49, 49 and the rod 54. When the appropriate degree of rotational displacement has been effected the locking screw 44a is then clamped down tight to fixedly position the bushing 42b and the proximate end of said torsion rod. The actuator means may include a valve housing such as 56 suitably associated with and carried by the tractor frame 10, either by being fashioned as an integral component thereof or by being separately fashioned and positioned therewithin. Said valve housing is fashioned to provide an interior chamber 57 therein connected for fluid communication by way of a conduit 58 with the ram cylinder 16 and by way of conduit 59 with the suction inlet of a hydraulic pump, such as indicated at 60, while a conduit 58a connects the discharge outlet thereof with said cylinder through conduit 58. A further conduit 61 connects said chamber with a fluid reservoir such as indicated at 62. A piston, indicated generally at 63 and having a forward portion 63F and a rearward portion 63R with a rod 64 connected therebetween, is slidably positioned within the chamber 57.

A biasing spring 65 poistioned between the end of the piston portion 63R and the proximate end wall 68 provides a suitable means for positioning the piston and helping to locate the respective piston portions 63F and 63R so that normally they overlie and close the openings from the respective conduits 59 and 58 and thereby prevent the entrance or release of fluid to or from the ram cylinder 16 as is well understood.

The piston assembly 63 has a connecting rod 69 connected thereto which extends through the proximate end wall 68 of the housing 56 and has a transversely extending pin 70 in the outward end thereof. The sensing control or push rod 54 is pivotally connected at its forward end, as indicated at 71, to a link 72 intermediate the ends thereof.

The upper end of link 72 may be fashioned with a yoke or bifurcated portion so as to be positionable to engage opposite end portions of the pin 70, in rod 69, while the opposite end of the link 72 is pivotally connected at 73 to a member 74 that is pivotally connected at its opposite end by a pivot 75 to an arm 76 that represents an extension of the control handle 77 that, in turn, is suitably pivoted at 78 to a quadrant sector 79 mounted on the tractor frame 10. The pivotal connection 78 may include any well-known friction means for resisting movement of the control handle 77 out of a preselected position except when manually motivated. Since such frictional means are conventional and so well known for similar purposes, it was felt a full description of the details of a specific frictional means herein was unnecessary.

In operation, the handle 77 is initially moved to the position on the quadrant corresponding to the anticipated draft load which, in the present instance, rotates it to the right, or clockwise as viewed in FIGURE 2, whereupon the attached member 74 tends to move link 72 but since the control rod 54 is fixed at this time the link 72 rotates clockwise about its fulcrum connection 71 with rod 54. As link 72 rotates, the upper end thereof tends to move away from pin 70 in the connecting rod 69 and thereby permits the spring 65 to move the piston 63 to the right, whereupon the fluid conduit line 58 is placed in fluid communication through chamber 57 with the conduit line 61 and the reservoir 62 and fluid is released or exhausted from the ram cylinder 16. With the release of fluid from said cylinder, the piston 17 therein is urged to the right, as the result of the weight of the implement 26 acting through the draft links 22, drop links 21, lift arms 20, rockshaft 15, crank arm 19 and rod 18, and the implement is thereby lowered to enter the ground. As the vehicle moves forwardly the implement penetrates further into the ground and the draft forces of the soil increasingly react thereon. When the implement reaches the depth corresponding to the preselected position of the hand lever 77, the draft forces will be such as to tend to rotate the implement clockwise about the pivot 24 and thereby put a compression force in the upper link 29. This force, in turn, is resisted or reacted upon by the torsion rod 39 and when said compression force becomes sufficient to override said torsion rod reaction the rod rotates sufficiently to cause arms 49, 49 to displace the control rod 54 rearwardly as viewed in FIGURES 1 and 2. This rearward movement of rod 54 will cause the link 72 to rotate counterclockwise about its pivotal connection 73 with the member 74 and thus move the upper end of said link rearwardly carrying with it the pin 70 and rod 69. As the rod 69 moves the piston assembly 63 also moves and the piston portions 63F and 63R are again positioned to cover the openings to conduits 59 and 58 to prevent further displacement of fluid from the ram cylinder 16. The valve has now returned to neutral, and the draft force resultant is balanced against the reaction of the torsion rod 39.

When the draft forces are increased, such as when encountering dense soil, obstructions, or the like, the implement will tend to rotate clockwise about its pivotal connections 24 so as to increase the compression force in the upper link 29 and at the same time moving said link forwardly. As the link 29 is moved forwardly against the resistance or reaction of torsion rod 39 the interconnected control rod 54 is moved rearwardly and this movement carries with it the connecting rod 69 and the attached piston portions 63F and 63R so that the fluid supply conduit suction line 59 is placed in communication through chamber 57 (FIGURE 8) with conduit line 61 opening into the reservoir 62 and fluid under pressure from the pump 60 may be delivered by way of conduits 58a and 58 to the cylinder 16 to raise the implement 26. As the implement is raised the draft forces effective thereon are decreased and following which the compression force in the upper link 29 is decreased whereupon the torsion rod 39 will react to reposition said upper link and the control rod 54 causing the latter to move forwardly away from pin 70 in rod 69 and thereby permitting the spring 65 to move the piston portions 63F and 63R forwardly to cover the conduit openings 59 and 58 and thus return the valve to a neutral position.

In the event the draft forces are decreased, there will be a tendency for the implement to rotate counterclockwise about its pivotal connections 24 and thereby set up a tension force in the upper link 29 and a compression force in the control rod 54. This compression force, in turn, causes the rod 54 to move forwardly away from pin 70 in rod 69 thereby permitting spring 65 to move the piston portions 63F and 63R forwardly until conduit line 58 is placed in communication with the reservoir conduit line 61 which then permits fluid to be released from the cylinder 16 and the implement to be lowered. As the implement is lowered deeper into the ground the draft forces effective thereon are increased following which the direction of the forces in the upper link 29 and control rod 54 are reduced or reversed and the reaction of the torsion rod 39 then becomes effective to move the rod 54 rearwardly carrying with it the rod 69 and piston portions 63F and 63R so as to reestablish the actuator valve 55 in a neutral condition.

Figure 6:
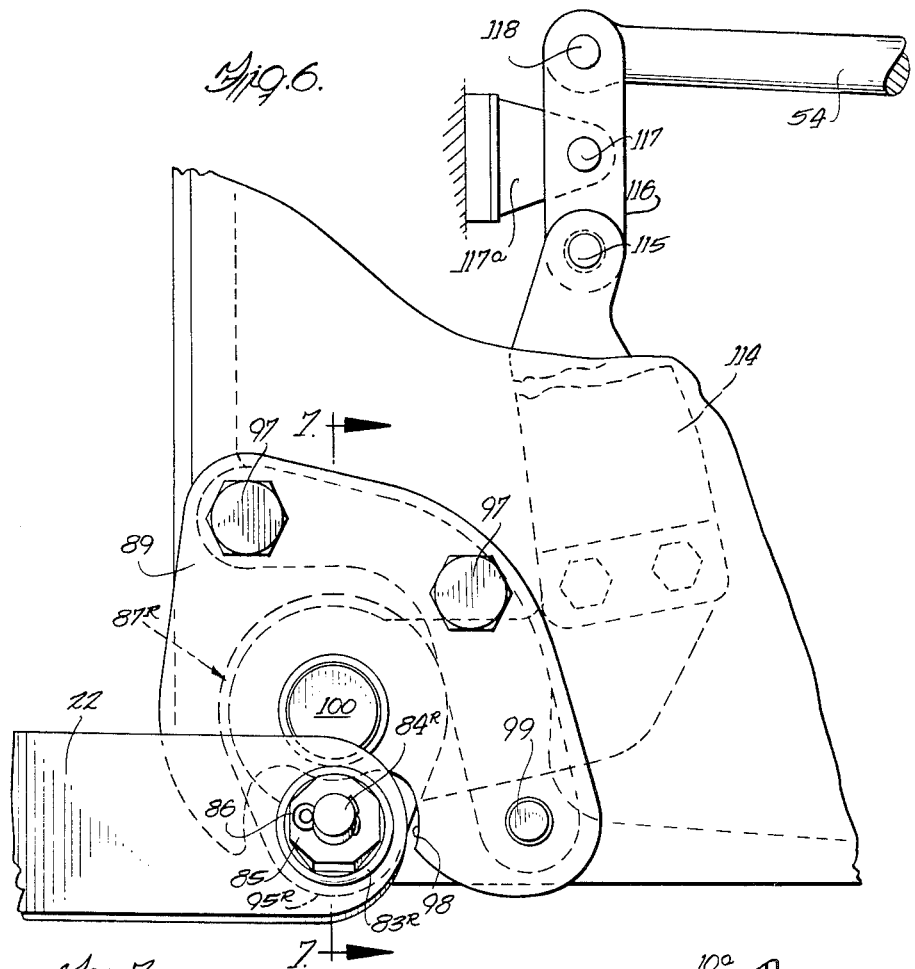
FIGURE 6 is a fragmentary side-elevational view, in enlarged detail, showing the lower link mounting mechanism of the form of the invention shown in FIGURE 5.
Figure 7:
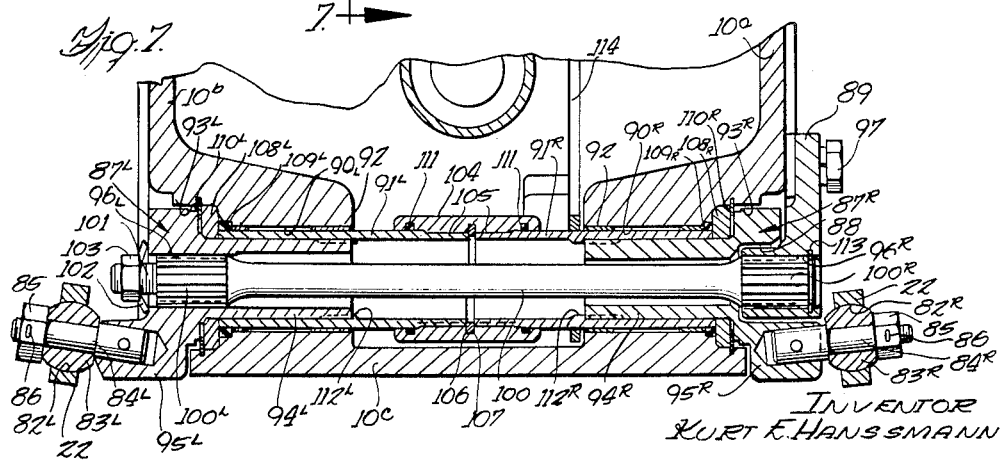
FIGURE 7 is a fragmentary vertical sectional view taken generally along the line 7—7 of FIGURE 6.

In FIGURES 5-7 there is illustrated a modified form of the present invention wherein the force-resisting and yieldable means is associated with and reactive upon the lower draft links of the hitch mechanism. In these views, the same reference characters, as heretofore employed, are used to indicate identical parts, while the modified or new elements have been referenced with different characters.

In this application of the invention the upper link 29 is pivotally connected, by suitable connecting means such as shown at 80, to a bracket 81 that, in turn, is securedly mounted on the tractor frame 10. The lower links 22, 22 are respectively provided at their forward ends with spherical apertures 82R and 82L adapted to receive spherical portions 83R and 83L journaled on pins 84R and 84L fixedly positioned in appropriate pin cranks. The outer ends of the pins 84R and 84L are threaded to receive locking nuts such as 85 which may be locked in place by conventional cotter keys such as shown at 86. It will be noted that a right-hand or right side (as viewed in FIGURE 7) pin crank, designated 87R, although generally similar to is not identical with a left-hand or left side pin crank, indicated 87L, since the said crank 87R is provided with an enlarged recess at 88 to accommodate a portion of an anchor bracket 89 disposed on the right-hand side of the frame.

The rear portion of the tractor frame 10 may be fashioned to provide spaced vertical walls 10a and 10b with an interconnecting wall portion 10c therebetween. Aligned openings 90R and 90L in said walls accommodate transversely extending and oppositely disposed bearing tubes 91R and 91L journaled therein by a plurality of sleeve bearings such as 92. Enlarged recesses 93R and 93L, in wall portions 10a and 10b and disposed at opposite ends of the aligned openings 90R and 90L, accommodate the pin cranks 87R and 87L, while the axially extending sleeve portions 94R and 94L respectively, provided on said cranks, in turn, are receivable in the bearing tubes 91R and 91L. An enlarged flange-like portion 95R on the outer end of pin crank 87R carries the draft link pin 84R and a portion of said flange is receivable in the enlarged recess 93R in wall portion 10a while a similar enlarged flange-like portion 95L on pin crank 87L carries the draft link pin 84L and a portion of said latter flange is receivable in the enlarged recess 93L in wall portion 10b.

The pin crank 87L is provided with an axially splined opening 96L while the oppositely disposed anchor bracket 89 has a generally similar axially splined opening 96R aligned therewith. The anchor bracket 89, which may be affixed to the outer side of wall 10a by suitable securing means such as the bolts or cap screws 97, is provided with a cutout portion 98 that is adapted to rotatably accommodate therewithin a portion of the pin crank 87R and its flange 95R, as best seen in FIGURE 6. A dowel pin, such as shown at 99 anchored in the wall portion 10a and receivable in a registering opening in the anchor bracket 89, may be provided to further stabilize the mounting of said bracket on the proximate frame wall.

A torsion bar 100 having enlarged splined opposite end portions 100R and 100L is positionably received in the mating splines of the openings 96R and 96L in the respective anchor bracket 89 and pin crank 87L. A threaded reduced section extension 101 on one end of said torsion bar is adapted to receive a Belleville washer 102 and a lock nut 103 thereon so as to aid in preventing axial displacement of said torsion rod. Since the axial opening through the extension sleeve 94R is smaller than the diameter of the splined end portion 100R of the torsion rod 100 it will be appreciated that said rod cannot normally be axially displaced to the left through said opening, and with the nut 103 and washer 102 in place it cannot be displaced to the right. In this connection, it will be appreciated that the axial opening through extension sleeve 94L will be slightly larger than the splined end portion 100L of the torsion rod 100 so as to facilitate easy assembly and disassembly of the mechanism.

A coupling sleeve 104 is mounted so as to subtend the adjacent inner ends of the bearing tubes 91R and 91L, and said sleeve is suitably secured to said tubes by the splines indicated at 105 thus the two said bearing tubes are coupled together through said coupling sleeve for rotation as a unit. A snap-ring 106 disposed in an annular groove 107 in the coupling sleeve 104 and located between the proximate ends of the bearing tubes 91R and 91L serves to center said coupling sleeve centrally of the frame portions 10a and 10b. Thrust collars 108R and 108L may be disposed as shown between the pin crank members 87R and 87L and the ends of the respective bearing tubes 91R and 91L with portions thereof also bearing against the radial inner wall surfaces of the respective enlarged recesses 93R and 93L. O-ring seals such as 109R and 109L may be employed as indicated between the respective thrust collars 108R and 108L and the interior area of the vehicle frame which will usually contain fluid under pressure as is well understood.

Tapered snap-rings 110R and 110L, which are positionable in annular grooves in the respective frame portions 10a, 10b, may be provided to aid in retaining the thrust collars 108R and 108L against accidental axial displacement. Additional fluid scales, such as shown by reference numeral 111, may be provided as indicated to prevent fluid leakage between the coupling sleeve 104 and the bearing tubes 91R and 91L. The inner ends of the extension sleeves 94R and 94L are coupled to the respective bearing tubes 91R and 91L by means of the splines respectively indicated at 112R and 112L. A snap-ring 113 disposed in an annular groove in the torsion rod end portion 100R and abutting an enlarged end portion of the opening 96R may be used to affix the rod 100 against axial displacement thereof in one direction relative to the anchor bracket 89.

Referring to FIGURE 6, it will be seen that a crank member 114, indicated partly in broken and partly in full lines, is affixed, by any suitable or well known means such as welding, brazing, splining or the like, to and extends forwardly and upwardly from the bearing tube 91R and as thus disposed is constrained for rotation therewith.

The upper end of the crank 114 is pivotally connected at 115 to a lever 116, pivotally mounted at 117 to a support 117a affixed to the frame 10, and the opposite end of said lever is pivotally connected at 118 to the control rod member 54. The pivot 115, preferably, operates in an oversized opening in the lever 116 to provide a yieldable, sloppy or loose joint type of connection or, if desired, may be generally similar to the slot-like or irregular shaped opening shown at 50 in FIG. 4 without deviating from any of the inventive concepts hereof. The opposite or forward end of said control rod is pivotally connected, as previously noted, at 71 to the link 72 which, in turn, operatively connects with the valve actuating and control mechanism heretofore described in detail.

The operation of the form of the invention shown in FIGURES 5–7 is substantially identical to the form previously described and illustrated in FIGURES 1–4, in that the forces produced in the draft links by draft loads are resisted or reacted against by the torsional stressing reaction of a torsion bar and when such forces exceed predetermined amounts signals are transmitted to valve actuating mechanism operative for raising or lowering the power lift means according to the demands imposed upon the attached implement.

Since any increase in draft loads in this instance is registered through the lower links and tends to rotate the torsional members clockwise, as contrasted with the first described form of the invention where such increase was registered by a compression force in the upper link which urged counterclockwise rotation, it is necessary to couple the crank arm 114 to a reversing link or lever 116 so that the direction of motion of the control rod 54 will be the same regardless of whether draft loads are sensed by the upper or lower links of the hitch mechanism.

In operation, the draft loads on the implement as a result of soil reaction thereon normally tends to rotate the implement clockwise about the pivots 24, but, since the upper part of the rigid mast 27 is pivotally connected to the upper link 29 which resists such rotation, the lower draft links will, instead, then be subjected to a tension force which tends to urge them rearwardly. When this occurs the links 22, 22 being connected to the pin cranks 87R and 87L will urge rotation of said cranks in a clockwise direction, as viewed in FIGURE 6, and this movement will be carried by the sleeve members 94R, 94L, the bearing tubes 91R, 91L and the interconnected coupling sleeve 104 to the torsion rod 100 which, being connected by splining at the end portion 100L thereof to the pin crank 87L, will rotate therewith. Since the opposite end of said torsion rod is connected by splining at 100R to the anchor bracket 89, in turn, fixedly secured to the tractor frame, the rod will not be free to rotate but will, instead, set up a yieldable torsional reaction opposing such rotation. Any rotation of the bearing tube 91R is, of course, accompanied by a corresponding rotation of the attached crank member 114 which thereupon attendant such movement transmits a sensing signal through the control rod 54 to actuate the valve unit 55 and subsequently operate the lift cylinder and hitch mechanism.

It will be appreciated, of course, as previously noted, that a decrease in draft loads will permit reversal of direction of the resultant forces in the control rod member with an attendant movement of the valve in a direction such as to effect a release of fluid from the lift cylinder and a lowering of the attached implement.

It will be readily apparent that the proposed invention provides a very simple, highly effective and inexpensive to fabricate force-resisting and yieldable means for balancing out draft loads in a hitch mechanism. It will also be recognized that the proposed invention is readily applicable to conventional hitch mechanisms without necessitating substantial redesign or reconstruction, and additionally, that such device is positive in action and can be made as sensitive as desired.

The foregoing and other desirable features not specifically enumerated herein will undoubtedly occur to those versed in the art, as will numerous modifications and alterations in the preferred forms of the invention disclosed, all of which may be achieved without departing from the spirit and scope of the invention as defined in the appended claims.

What is claimed is:

1. In a tractor having power lift means for raising and lowering a vehicle-borne implement, and actuator means for controlling the operation of said lift means, the combination, comprising: tubular means supportably mounted by the tractor for rotative movement and disposed transversely thereof; an elongated bar positioned within said tubular means and having one end thereof anchored against rotation relative to the tractor and the other end constrained for rotative movement with said tubular means and being resilienly yieldable upon torsional stressing in any direction of rotation; implement-connecting draft means having a pair of elements spaced apart lengthwise of and respectively connected to end portions of said tubular means for torsionally stressing the attached bar in response to implement draft loads; crank arm means extending from a midportion of and constrained for rotation with said tubular means; and sensing means interconnected between said crank arm means and the actuator means and operative for transmitting movements of said tubular means to the actuator means for effecting operation of the power lift means.

2. The structure defined in claim 1 and further characterized in that the tubular means includes crank arms disposed one at each end of said tubular means and are connected thereto for movement therewith, and further in that said pair of draft elements are connected to said crank arms for rotative movement thereof and consequent torsional stressing of the said elongated rod in response to implement draft loads.

3. In a tractor having power lift means for raising and lowering a vehicle-borne implement, and actuator means for controlling the operation of said lift means, the combination, comprising: tubular means supportably mounted by the tractor for rotative movement and disposed transversely thereof; a pair of crank arms connected one each to and extending from an end of said tubular means; an elongated bar positioned within said tubular means and having one end thereof extending into and constrained for rotative movement with one of said crank arms; detachable means supportably affixing the opposite end of said bar to the tractor for preventing movement of said opposite end of said bar relative to the tractor, and having said bar resiliently yieldable upon torsional stressing in either a clockwise or counterclockwise direction of rotation; implement-connecting draft means having a pair of draft links spaced apart lengthwise of said tubular means and respectively connected to said crank arms for rotative movement thereof and consequent torsional stressing of said elongated bar in response to implement draft loads; crank arm means connected to a midportion of and constrained for rotative with said tubular means and extending therefrom angularly displaced relative to said pair of crank arms; and sensing means interconnected between said crank arms means and the actuator means and operative for transmitting movements of said tubular means to the actuator means for effecting operation of the power lift means.

4. In a tractor having a frame casing portion fashioned to provide laterally spaced opposite side walls and supportably carrying a power lift means for raising and lowering a vehicle-borne implement, and actuator means for controlling the operation of said lift means, the combination, comprising: tubular means transversely disposed relative to the frame casing and having the casing side walls provided with aligned apertures for rotatably accommodating opposite end portions of the tubular means therein; a pair of crank arms connected one each to and extending from an end of said tubular means; an elongated bar positioned within said tubular means and having one end thereof extending into and constrained for rotative movement with one of said crank arms; detachable means supportably affixing the opposite end of said bar to the tractor casing portion and arranged to prevent movement of said opposite end of said bar relative to the tractor, and having said bar resiliently yieldable upon torsional stressing in either a clockwise or counterclockwise direction of rotation; implement-connecting draft means having a pair of draft links spaced apart lengthwise of said tubular means and respectively connected to said crank arms for rotative movement thereof and consequent torsionsal stressing of said elongated bar in response to implement draft loads; crank arm means connected to a midportion of and constrained for rotation with said tubular means and extending therefrom angularly displaced relative to said pair of crank arms; and sensing means interconnected between said crank arm means and the actuator means and operative for transmitting movements of said tubular means to the actuator means for effecting operation of the power lift means.

5. The structure defined in claim 4 and further characterized in that said tubular means includes a pair of axially aligned tubular members and an additional tubular member concentric with and overlying proximate end portions of said pair of tubular members and constrained for rotative movement therewith, and further having said crank arm means extending from and constrained for movement with one of said pair of tubular members.

6. In a tractor having a fluid containing frame casing portion fashioned to provide laterally spaced opposite side walls and supportably carrying a power lift means for raising and lowering a vehicle-borne implement, and actuator means for controlling the operation of said lift means, the combination, comprising: tubular means transversely disposed relative to the frame casing and having the casing side walls provided with aligned apertures for rotatably accommodating opposite end portions of the tubular means therein; fluid sealing means disposed one each between opposite end portions of said tubular means and respective side wall apertures; said side walls being provided with an enlarged recess adjacent the outward end of each aperture therein; a pair of crank arms disposed one in each of said recesses and connected one each to and extending from an end of said tubular means; an elongated bar positioned within said tubular means and having one end thereof extending into and constrained for rotative movement with one of said crank arms; detachable means supportably affixing the opposite end of said bar to the tractor casing portion and arranged to prevent movement of said opposite end of said bar relative to the tractor, and having said bar resiliently yieldable upon torsional stressing in either clockwise or counterclockwise direction of rotation; implement-connecting draft means having a pair of draft links spaced apart lengthwise of said tubular means and respectively connected to said crank arms for rotative movement thereof and consequent torsional stressing of said elongated bar in response to implement draft loads; crank arm means connected to a centrally disposed portion of and constrained for rotation with said tubular means and extending therefrom angularly displaced relative to said pair of crank arms; and sensing means interconnected between said crank arm means and the actuator means and operative for transmitting movements of said tubular means to the actuator means for effecting operation of the power lift means.

7. The combination with a tractor having a longitudinal frame and a transverse rear axle housing assembly portion and substantially horizontal wheel mounting axle means therein, implement attaching draft means behind the tractor having upper and lower link means with said lower link means including a pair of draft members spaced apart at forward ends thereof, means mounting said lower link means coaxially to the tractor on an axis generally parallel to the axle means below the same, means mounting said upper link means to the tractor above the axle means, said rear axle housing assembly portion having a pair of coaxially aligned openings therethrough disposed on an axis generally parallel to the axle means at a level vertically displaced from the same, a torsion bar assembly having an axis of operation generally parallel to the axle means, means journally mounting said torsion bar assembly within said openings and having opposite end portions of said assembly extending outwardly one portion each beyond an outer edge of a respective opening, crank means mounted on said torsion bar assembly, said torsion bar assembly serving as the axis of pivot for the crank means and operative to transmit implement draft loads to the tractor in draft forces oriented about said axle means, said crank means including upper and lower arm means, draft sensing means on the tractor connected to said upper arm means, said lower arm means including crank members mounted one each on said torsion bar assembly end portions and having said pair of draft members connected one each to a respective crank member.

8. The invention according to claim 7 and further characterized in that said outwardly extending opposite end portions of said torsion bar assembly are fashioned to include separate tubular means and having additional tubular means interconnecting said separate means, and further in that the upper arm means of said crank means is mounted on said additional tubular means and constrained for rotation therewith.

9. The combination with a tractor having a longitudinal frame and a transverse rear axle housing assembly portion and substantially horizontal wheel mounting axle means therein, implement attaching draft means behind the tractor having upper and lower link means with said lower link means including a pair of draft members spaced apart at forward ends thereof, means mounting said lower link means coaxially to the tractor on an axis generally parallel to the axle means below the same, means mounting said upper link means to the tractor above the axle means, said rear axle housing assembly portion having a pair of coaxially aligned openings therethrough disposed on an axis generally parallel to the axle means at a level vertically displaced from the same, a torsion bar assembly mounted within said openings and having an axis of operation generally parallel to the axle means, said torsion bar assembly having inner and outer telescoped elements, said outer element being generally tubular in form and said inner element in the form of a rod, said tube and rod elements interconnected at one of their corresponding ends, a pair of bearing means sleeved over said tube and spaced longitudinally thereof and disposed in tight fit relationship one in each of said openings, the outer tubular element of said torsion bar assembly having opposite end portions extending outwardly one portion each beyond an outer edge of a respective opening, means connecting another end of said rod to said housing assembly portion in an area spaced longitudinally of the area of location of said bearing means, crank means mounted on said outer tubular element, said outer tubular element serving as the axis of pivot for the crank means and operative to transmit implement draft loads to the tractor in draft forces oriented about said axle means, said crank means including upper and lower arm means, draft sensing means on the tractor connected to said upper arm means, said upper arm means of said crank means being mounted on said outer tubular element in an area intermediate said pair of openings, said lower arm means including a pair of crank members mounted one each on said outer element end portions and having said pair of draft members connected one each to a respective crank member.

10. In a tractor, the combination of a body structure having a pair of transversely spaced hitch supporting members; a torsion bar extending axially through aligned apertures of said members and non-rotatably connected at one of its ends with one of said members; a tubular member rotatably mounted at its axially opposite ends, respectively, in said apertures of said members in surrounding relation to said torsion bar and having an end portion adjacent to the other of said members nonrotatably connected with the other end of said torsion bar; a pair of mounting arms for a pair of draft links nonrotatably secured to said tubular member; and an actuating element for a power lift control mechanism connected with said tubular member so as to be swung back and forth about the axis of the latter by back and forth rotation of said tubular member in said members.

11. The combination with a tractor having a longitudinal frame and a transverse rear axle housing assembly portion and substantially horizontal wheel mounting axle means therein, implement-attaching draft means behind the tractor housing having upper and lower link means, means mounting said lower link means coaxially to the tractor on an axis generally parallel to the axle means below the same, means mounting said upper link means to the tractor above the axle means, said rear axle housing assembly portion having a pair of coaxially aligned openings disposed on an axis generally parallel to the axle means at a level vertically displaced from the same, a torsion bar assembly having an axis of operation generally parallel to the axle means at a level below the same, means journally mounting said torsion bar assembly within said openings, crank means mounted on said torsion bar assembly, said torsion bar assembly serving as the axis of pivot for the crank means and operative to transmit implement draft loads to the tractor in draft forces oriented about said axle means, draft sensing means on the tractor connected to said crank means, and having said lower one of said implement-attaching draft means connected to said crank means.

12. The combination with a tractor having a longitudinal frame and a transverse rear axle housing assembly portion and substantially horizontal wheel mounting axle means therein, implement-attaching draft means behind the tractor housing having upper and lower link means, means mounting said lower link means coaxially to the tractor on an axis generally parallel to the axle means below the same, means mounting said upper link means to the tractor above the axle means, said rear axle housing assembly portion having a pair of coaxially aligned openings disposed on an axis generally parallel to the axle means at a level vertically displaced from the same, a torsion bar assembly having an axis of operation generally parallel to the axle means, means journally mounting said torsion bar assembly within said openings, crank means mounted on said torsion bar assembly, said torsion bar assembly serving as the axis of pivot for the crank means and operative to transmit implement draft loads to the tractor in draft forces oriented about said axle means, draft sensing means on the tractor, and said crank means including upper and lower arm means with said upper arm means being connected to said draft sensing means and said lower arm means being connected to the lower link means of said implement-attaching draft means.

References Cited by the Examiner

UNITED STATES PATENTS

| | | | |
|---|---|---|---|
| 2,705,154 | 3/1955 | Torre | 267—57 X |
| 2,950,103 | 8/1960 | Ruf | 267—57 |
| 3,022,830 | 2/1962 | Hess | 172—7 |

FOREIGN PATENTS 606,867   7/1960   Italy.

ABRAHAM G. STONE, *Primary Examiner.*